United States Patent [19]

Hammond

[11] Patent Number: 4,766,601
[45] Date of Patent: Aug. 23, 1988

[54] CONSTANT CARRIER WATCHDOG
[75] Inventor: John A. Hammond, Portland, Oreg.
[73] Assignee: Tektronix, Inc., Beaverton, Oreg.
[21] Appl. No.: 812,474
[22] Filed: Dec. 23, 1985
[51] Int. Cl.[4] .............................................. H04L 27/10
[52] U.S. Cl. ........................................ 375/59; 375/94;
455/161
[58] Field of Search ................... 375/8, 59, 82, 45, 88,
375/89, 94, 95; 179/2 C, 2 DP; 455/50, 164,
229, 161, 166

[56] References Cited
U.S. PATENT DOCUMENTS

| Re. 32,327 | 1/1987 | Biba et al. ............................. 370/124 |
| 3,614,317 | 10/1971 | Benowitz ................................ 375/89 |
| 3,811,090 | 5/1974 | Uchida et al. ......................... 455/229 |
| 3,824,475 | 7/1974 | Pflasterer .............................. 455/166 |
| 4,088,833 | 5/1978 | Godard et al. ........................ 375/102 |
| 4,355,406 | 10/1982 | Guidoux ................................. 455/50 |
| 4,387,401 | 6/1983 | Henderson et al. ............. 358/193.1 |
| 4,434,486 | 2/1984 | Barner, Jr. et al. .............. 370/110.1 |
| 4,446,564 | 5/1984 | Pierce ..................................... 455/50 |
| 4,471,489 | 9/1984 | Konetski et al. ................. 179/2 DP |
| 4,566,111 | 1/1986 | Tanagawa ............................. 377/28 |
| 4,578,533 | 3/1986 | Pierce ................................. 179/2 DP |
| 4,608,699 | 8/1986 | Batlivala et al. ..................... 375/45 |

Primary Examiner—Robert L. Griffin
Assistant Examiner—Stephen Chin
Attorney, Agent, or Firm—Francis I. Gray

[57] ABSTRACT

A constant carrier watchdog circuit for an r.f. modem detects an anomalous constant "carrier on" condition in the modem. In response to this anomalous condition a signal is generated and output to the modem. The signal causes the carrier frequency to shift out of the data channel frequency bands so that the anomalous modem does not affect other users on a telecommunication network.

8 Claims, 3 Drawing Sheets

CONSTANT CARRIER WATCHDOG

BACKGROUND OF THE INVENTION

1. Field of the Invention.

The present invention relates to r.f. modems, and more particularly to a constant carrier watchdog circuit for an r.f. modem using frequency shift keying.

2. Description of the Prior Art.

In telecommunication systems many users access the same data channel on a time share basis. To access a broadband communications bus an r.f. modem, such as the Sytek Model 20/100, manufactured by Sytek, Inc. of Mountain View, Calif. is located at the users terminal. The r.f. modem detects when an r.f. channel is not busy and transmits a packet of data onto the r.f. channel. The data packet is addressed to a particular terminal with its own r.f. modem, and the r.f. modem passes the data packet to that terminal.

A plurality of such r.f. modems are networked together to form a telecommunication system, and each r.f. modem has the capability of accessing one of a plurality of data channels. At power up each r.f. modem selects one of the data channels via a PCU instruction which loads a count into a counter in the phase-locked loop frequency synthesizer. The count determines the frequency of the carrier for that r.f. modem, the frequency determining the data channel. Each r.f. modem also has a unique address on that data channel. Thus, by selecting the appropriate data channel and r.f. modem address, any terminal can communicate with any other terminal or computer host on the network.

The data is transmitted in the form of "1"s and " "s which cause a frequency shift of the carrier frequency. For example, to transmit data the carrier frequency may be turned on for "0"s, and shifted up or down for "1"s. However, from time to time due to an anomaly in the r.f. modem the carrier gets turned on when no data is being transmitted. When the r.f. modem asserts carrier on the communications channel, all other users on that data channel are locked off the network. For short periods of time this may not present a problem, but for longer periods, typically 8–10 seconds, this may result in data loss to other users.

The isolation of the offending r.f. modem once a user reports a problem requires a systematic turning off and on of each node of the network starting from the head-end and working down the branches. Once the node and branch from that node which contains the anomalous r.f. modem is discovered, then that branch is disconnected to allow the rest of the network to resume normal operation. Finally, each r.f. modem on the branch is then checked to discover the malfunctioning unit. This is a time consuming process which can take up to eight man hours to complete.

Therefore, what is desired is a means for instantaneously identifying an r.f. modem when it malfunctions in this manner.

SUMMARY OF THE INVENTION

Accordingly, the present invention provides a constant carrier watchdog which alerts a user when that user's r.f. modem anomalously generates a constant carrier. A missing pulse detector determines when a carrier is turned on continuously. A reset signal is then generated which resets the counter in the phase-locked loop of the r.f. modem to a value which corresponds to a frequency outside the frequency band of the data channels. This out-of-band frequency may be latched on, or may be turned off when the carrier is turned off. Also, an indicator alerts the user that the r.f. modem has malfunctioned.

The objects, advantages and novel feature of the present invention will be apparent from the following detailed description when read in conjunction with the appended claims and attached drawing.

DESCRIPTION OF THE PREFERRED EMBODIMENT

Figure 1:
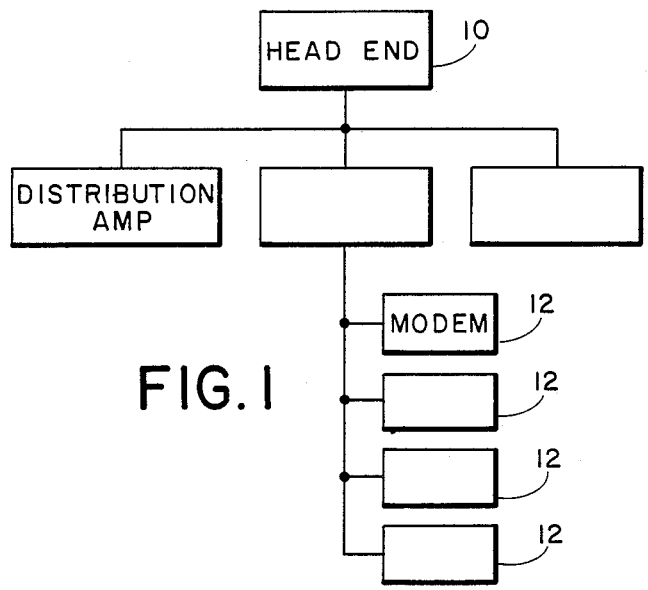
FIG. 1 is a block diagram of a typical broadband r.f. telecommunication local area network (LAN) system.

Referring now to FIG. 1, a typical broadband network tree is illustrated. A header unit 10 receives data packets from a plurality of r.f. modems 12 at one frequency. For more than one data channel the header unit 10 receives data packets from a plurality of modems 12 operating at a plurality of discrete frequencies, each frequency representing a unique data channel. The header unit 10 translates the incoming frequency, or plurality of frequencies, to a second frequency, or plurality of frequencies, which is transmitted back to the r.f. modems 12. Thus, each modem 12 transmits at one frequency, the frequency depending upon the assigned data channel, and receives at a second frequency. The frequency is determined by a data value loaded into a divide-by-N counter in the phase-locked loop of the r.f. modem 12 as is well known to those in the art.

Figure 2:
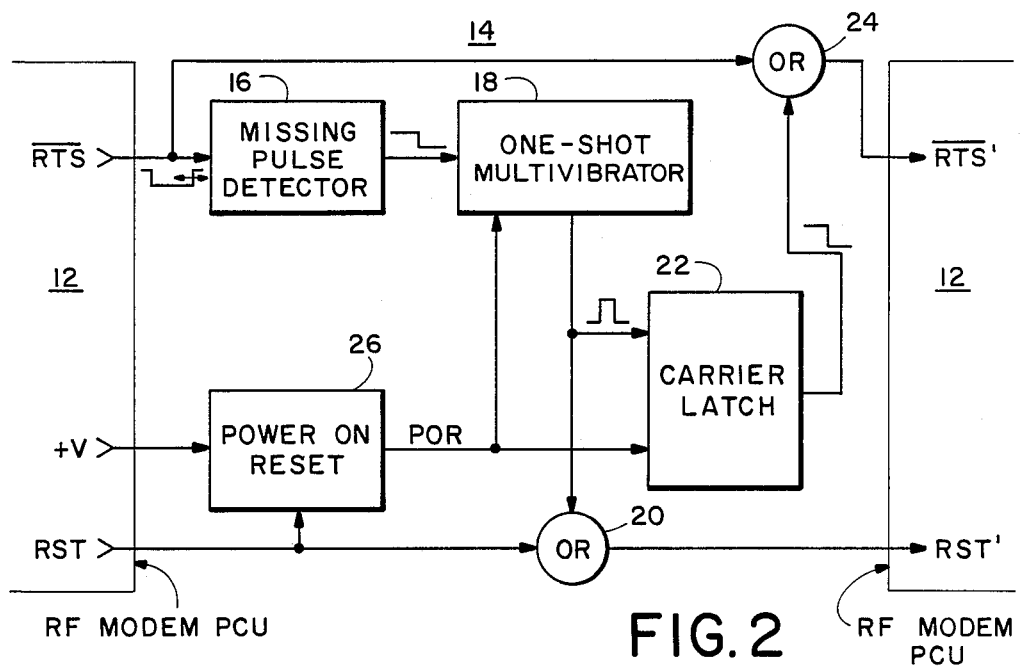
FIG. 2 is a block diagram of a constant carrier watchdog circuit according to the present invention.
Figure 3:
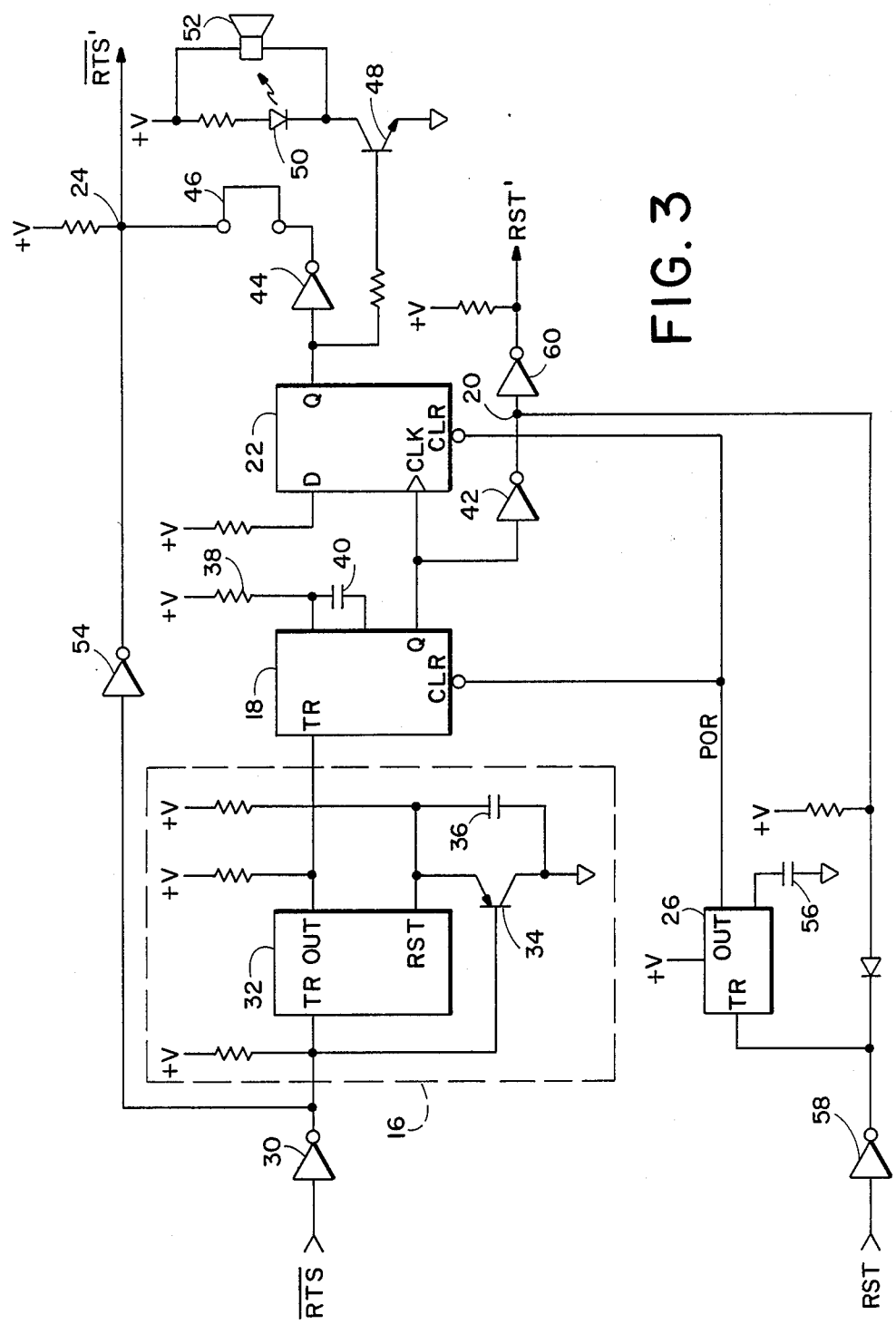
FIG. 3 is a schematic diagram for the constant carrier watchdog circuit of FIG. 2.

In FIGS. 2 and 3 /RTS represents the carrier on/off signal from the r.f. modem 12, and RST represents the initial reset pulse from the r.f. modem generated after the modem is first powered up. /RTS and RST are input to a constant carrier watchdog circuit 14 which outputs a modified carrier on/off signal /RTS' and reset pulse RST' to the modem 12. The /RTS signal is input to a missing pulse detector 16 which provides an output if /RTS is "on" continuously for at least a predetermined period of time, typically 5 seconds. The output of the missing pulse detector 16 triggers a one-shot multivibrator 18 which outputs a reset pulse. The reset pulse from the one-shot multivibrator 18 is combined with RST in an OR circuit 20 so that either RST or the reset pulse is output to the modem 12 as RST'. RST' resets the divide-by-N counter in the modem 12 to zero, causing the modem to output a new carrier frequency which happens to be outside the data channel bands for the modem. The result is to shift the carrier frequency from a data channel frequency to an out-of-band frequency.

The reset pulse may also be input to a carrier latch 22. In response to the reset pulse, the carrier latch 22 outputs a "carrier on" signal which is combined with /RTS in a second OR circuit 24 to produce /RTS'. /RST' resulting from the "carrier on" signal from the latch 22 locks the modem 12 carrier on at the out-of-band frequency.

A power on reset circuit 26 resets the one-shot multivibrator 18 and the carrier latch 22 when power is first applied to the constant carrier watchdog circuit 14.

In a specific embodiment, the missing pulse detector 16 receives /RTS, inverted by a buffer amplifier 30, at the trigger input of a monostable multivibrator 32, such as an NE555 monostable, which is set up as a missing pulse detector. The timer of the monostable 32 triggers on the positive edge of its input. If a negative edge occurs on the input within the allotted predetermined period, a transistor 34, connected in a common-collector configuration, is turned on into saturation by /RTS applied to its base. The conduction of the transistor 34 causes a capacitor 36, connected across the collector-emitter of the transistor and at the emitter end to the reset of the monostable 32, to discharge which resets the timer. If the negative edge of /RTS does not occur within the predetermined period, the output of the monostable 32 goes low and stays low until normal /RTS activity again occurs.

The low going output pulse from the monostable 32 is then input to a retriggerable monostable multivibrator 18, such as a 74LS123 retriggerable monostable set up as a one-shot timer. Once the falling edge of the monostable 32 output is detected, the Q output of the one-shot 18 goes high for a period, typically about 1.5 microseconds, determined by a resistor 38 and capacitor 40. This reset pulse from the one-shot 18 can be retriggered, i.e., lengthened, on a recurring falling edge on the input within the set time. This reset pulse is inverted by an amplifier 42 and OR'd with the reset line for RST to provide RST' to the modem 12. This reset causes the modem 12 to shift its frequency out of the data channel band. The reset pulse from the one-shot 18 is also input to the carrier latch 22.

The reset pulse is fed to the CLK input of the latch 22, such as a 74LS175 quad D-type flip flop. The D input of the flip flop 22 is held at the bus voltage, +V. Upon the rising edge of the reset pulse from the one-shot 18 at the CLK input, Q output goes high and stays high until reset by POR. The Q output is inverted by an amplifier 44 and is OR'd with the /RTS line at point 24 via a jumper 46 to form /RTS'. With the jumper 46 installed the carrier stays on, i.e., /RTS' stays low, until the flip-flop 22 is reset. If the jumper 46 is omitted, the carrier is not held on if /RTS returns to normal operation.

The Q output of the flip-flop 22 is also input to the base of an indicator transistor 48 in a common-emitter configuration. The positive Q output causes the transistor 48 to conduct which in turn causes an LED 50 to light and/or a small piezo-electric buzzer 52 to generate an audible alarm. Amplifier 54 in the /RTS line assures that RTS' is identical to /RTS during normal operation.

The power on reset circuit 26 provides a POR input to the one-shot 18 and latch 22 to ensure that the modem 12 does not accidentally turn on with the carrier stuck on. The POR circuit 26, such as a TL7705, provides POR a specified delay time after the bus voltage +V reaches a specified value upon power up. The reset duration may be changed by varying a capacitor 56. When the modem 12 supplies RST to the trigger input of the POR circuit 26, inverted by an amplifier 58, the leading edge of RST causes POR to go low, and the trailing edge causes the delay time to start so that a time, tw, later POR goes high. The RST line is reinverted by an amplifier 60 before going as RTS' to the modem 12 to provide normal operation.

Figure 4:
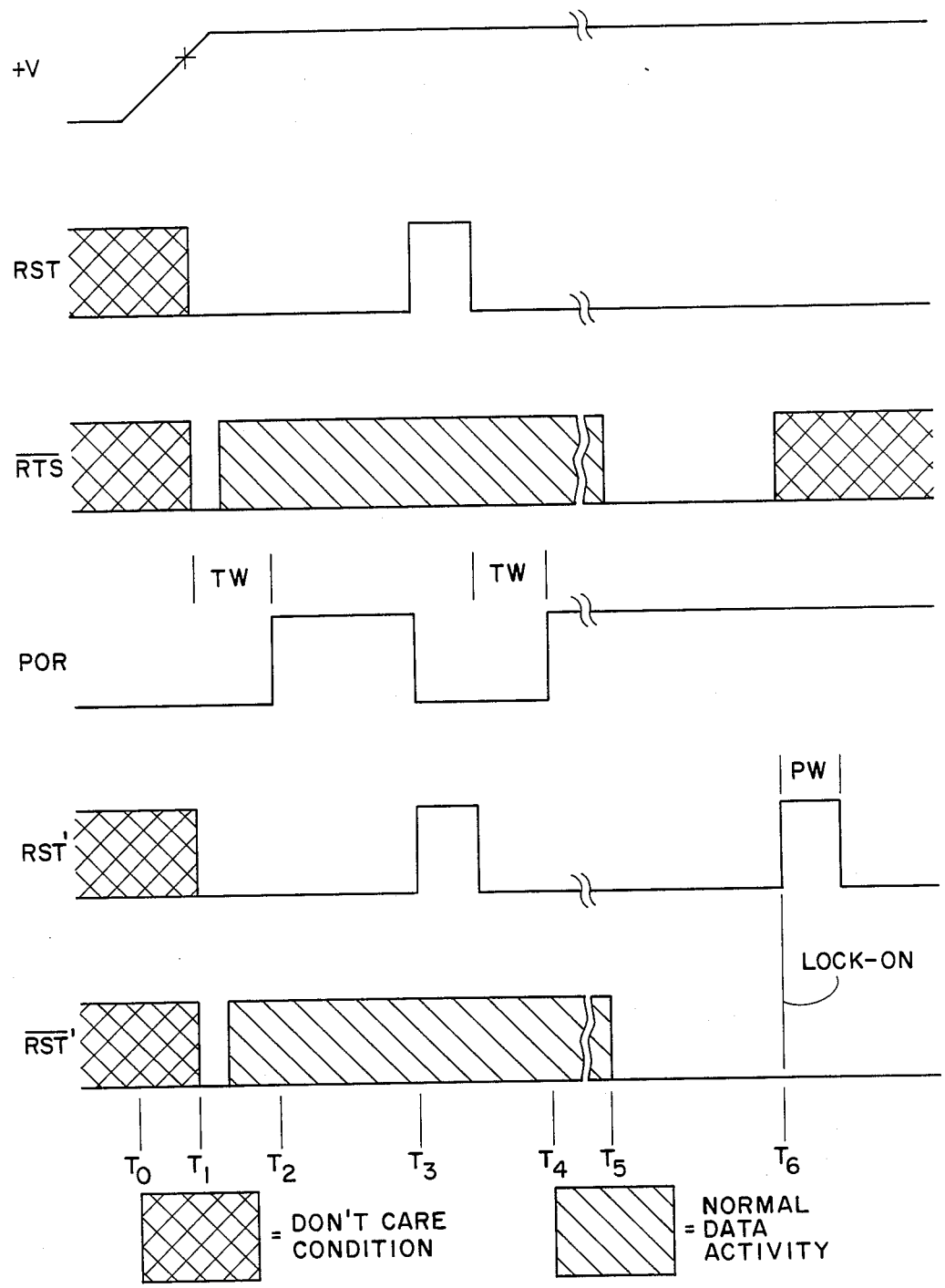
FIG. 4 is a timing diagram for the constant carrier watchdog circuit of FIG. 3.

In operation, as shown by reference to FIG. 4, at time $t_0$ the power is turned on to the modem 12 and the constant carrier watchdog circuit 14. At time $t_1$ the voltage bus exceeds a specified value and RTS starts normal data activity. The POR circuit 26 times out after time tw at time $t_2$. At time $t_3$ RST from the modem 12 triggers a POR pulse of duration RST+tw to clear the one-shot 18 and latch 22. RST also is passed to the modem 12 to reset the divide-by-N counter in the phase-lock loop among other functions. The divide-by-N counter is then loaded with a value corresponding to the data channel of operation for that modem 12. The modem 12 now commences normal data activity at time $t_4$.

At some time $t_5$ the modem 12 produces an anomalous constant carrier on condition. At time $t_6$ after time-out of the missing pulse detector 16, the one-shot 18 generates a reset pulse of duration pw which is output as RST' to the modem 12 to reset the divide-by-N counter to zero, causing the carrier to shift out-of-band. Also at $t_6$ the latch 22 provides a constant "carrier on" signal to the modem 12 so that the out-of-band carrier is continuous regardless of /RTS, and the LED 50 and/or alarm 52 are energized to alert the user of the problem.

Thus, the present invention provides a constant carrier watchdog circuit which detects an anomalous constant carrier condition in an r.f. modem, and shifts the carrier frequency out of the data channel band.

What is claimed is:

1. A constant carrier watchdog circuit comprising:
   means for detecting when a carrier frequency of a radio frequency modem is continuously on for longer than a predetermined period of time indicating a fault condition; and
   means for shifting said carrier frequency out of the data channel bands associated with said modem in response to the output of said detecting means when said predetermined period is exceeded.

2. A circuit as recited in claim 1 further comprising means for latching said shifted carrier frequency continuously on.

3. A circuit as recited in claim 2 further comprising means for resetting said shifting means when power is initially applied to said constant carrier watchdog circuit.

4. A circuit as recited in claim 1 wherein said detecting means comprises a timer having as an input a first signal representative of the on/off status of said carrier frequency, said timer being initiated by said first signal when said carrier frequency turns on and being reset by said first signal when said carrier frequency turns off, and having as an output a second signal when the time between turn on and turn off of said carrier frequency exceeds said predetermined period.

5. A constant carrier watchdog circuit comprising:
   a monostable multivibrator configured to trigger on the positive leading edge of a first signal representative of the turn on of a carrier frequency of a radio frequency modem, and to output a second signal after a predetermined period of time;
   a transistor in a common-collector configuration, having a capacitor connected between the collector and emitter, having the emitter connected to reset said monostable multivibrator and having said first signal input to the base of said transistor, such that the negative trailing edge of said first signal, representative of the turn off of said carrier frequency, causes said transitor to conduct to reset said monostable multivibrator; and
   means for shifting said carrier frequency out of the data channel bands associated with said modem in response to the second signal when the time between the leading and trailing edges of said first signal exceeds said predetermined period.

6. A circuit as recited in claim 1 wherein said shifting means comprises means for outputting a reset pulse to said modem after said predetermined period, said reset pulse causing said modem to generate said out of data channel band carrier frequency.

7. A circuit as recited in claim 6 wherein said outputting means comprises a one-shot multivibrator triggered by the output of said detecting means, the output of said one-shot multivibrator being said reset pulse.

8. A circuit as recited in claim 2 wherein said latching means comprises a carrier latch which outputs a continuous on signal to said modem for said carrier frequency in response the output of said shifting means when said carrier frequency is shifted.

* * * * *